United States Patent
Okano et al.

(10) Patent No.: US 8,557,439 B2
(45) Date of Patent: Oct. 15, 2013

(54) LITHIUM BATTERY INCLUDING POSITIVE ELECTRODE COMPRISING MANGANESE OXIDE IN A MIXED CRYSTAL STATE

(75) Inventors: Takuyuki Okano, Osaka (JP); Toshihiko Ikehata, Osaka (JP)

(73) Assignee: Panasonic Corporation, Osaka (JP)

( * ) Notice: Subject to any disclaimer, the term of this patent is extended or adjusted under 35 U.S.C. 154(b) by 410 days.

(21) Appl. No.: 12/920,732

(22) PCT Filed: Mar. 2, 2009

(86) PCT No.: PCT/JP2009/000927
§ 371 (c)(1),
(2), (4) Date: Sep. 2, 2010

(87) PCT Pub. No.: WO2009/110210
PCT Pub. Date: Sep. 11, 2009

(65) Prior Publication Data
US 2011/0020711 A1    Jan. 27, 2011

(30) Foreign Application Priority Data
Mar. 3, 2008 (JP) .................................. 2008-051785

(51) Int. Cl.
*H01M 4/50* (2010.01)
*H01M 6/16* (2006.01)
*H01M 10/056* (2010.01)

(52) U.S. Cl.
USPC ............................. 429/224; 429/340; 429/341

(58) Field of Classification Search
USPC ......... 429/224, 185, 329, 162, 172, 223, 340, 429/341
See application file for complete search history.

(56) References Cited

U.S. PATENT DOCUMENTS

| | | | |
|---|---|---|---|
| 4,277,360 A * | 7/1981 | Mellors et al. | 252/182.1 |
| 6,033,809 A | 3/2000 | Hamamoto et al. | |
| 6,267,943 B1 * | 7/2001 | Manev et al. | 423/599 |
| 2001/0022959 A1 * | 9/2001 | Manev et al. | 423/599 |
| 2006/0051672 A1 | 3/2006 | Sumitomo et al. | |
| 2006/0115728 A1 | 6/2006 | Kawai et al. | |
| 2006/0127778 A1 | 6/2006 | Kawai et al. | |
| 2007/0020171 A1 * | 1/2007 | Waki et al. | 423/599 |
| 2008/0032198 A1 | 2/2008 | Yamaguchi et al. | |

FOREIGN PATENT DOCUMENTS

| | | |
|---|---|---|
| JP | 11-162511 | 6/1999 |
| JP | 2000-003724 | 1/2000 |
| JP | 2004-047413 | 2/2004 |
| JP | 2005-100944 | 4/2005 |
| JP | 2005-216867 | 8/2005 |
| JP | 2006-100247 | 4/2006 |
| JP | 2008-027837 | 2/2008 |
| WO | WO 2005/124900 A1 | 12/2005 |

\* cited by examiner

*Primary Examiner* — Kenneth Douyette
(74) *Attorney, Agent, or Firm* — McDermott Will & Emery LLP

(57) ABSTRACT

The present invention has an objective to improve the storage characteristics and pulse discharge characteristics, especially in the high temperature region of 100° C. or more, of a lithium battery comprising a positive electrode including manganese oxide, a negative electrode, and a non-aqueous electrolyte. To achieve this objective, the lithium battery of the present invention includes a positive electrode (3) including manganese oxide in mixed crystal state, a negative electrode (4) desorbing lithium ions during discharging, and a non-aqueous electrolyte having lithium ion conductivity. The aforementioned manganese oxide in mixed crystal state includes at least λ-type manganese oxide and β-type manganese oxide. The aforementioned non-aqueous electrolyte includes at least one additive selected from the group consisting of cyclic sultone compounds and sulfone compounds.

4 Claims, 1 Drawing Sheet

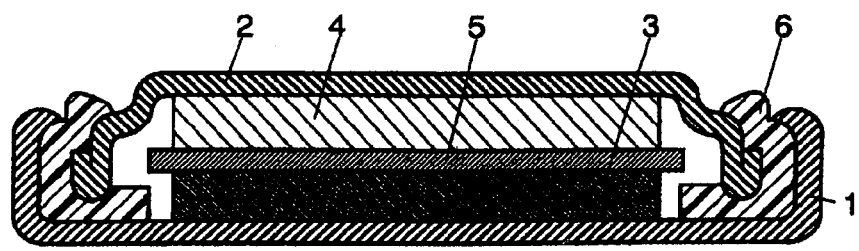

LITHIUM BATTERY INCLUDING POSITIVE ELECTRODE COMPRISING MANGANESE OXIDE IN A MIXED CRYSTAL STATE

RELATED APPLICATIONS

This application is the U.S. National Phase under 35 U.S.C. §371 of International Application No. PCT/JP2009/000927, filed on Mar. 2, 2009, which in turn claims the benefit of Japanese Application No. 2008-051785, filed on Mar. 3, 2008, the disclosures of which Applications are incorporated by reference herein.

TECHNICAL FIELD

The present invention relates to a lithium battery, and specifically relates to an improvement of storage characteristics, electric characteristics, and reliability of a lithium battery in a high temperature environment.

BACKGROUND ART

Lithium batteries have been widely used as power sources for electronic devices whose temperature range for use is set to about −20 to 60° C. based on the temperature range of living environment of human. Meanwhile, the application range of electronic devices using batteries as power sources has been growing recently, and along with that, the temperature range for use of electronic devices has also been growing. For example, batteries used for on-vehicle electronic devices are required to maintain their function for a certain period of time even in a high ambient temperature of about 125° C., and they are also required to operate even at a low temperature of about −40° C.

As batteries suitable for uses in such a high temperature environment, lithium primary batteries using manganese-containing oxides such as manganese dioxide or fluorinated graphite in the positive electrode and using lithium or lithium alloys in the negative electrode have good prospects. However, in a high temperature environment, a solvent of the electrolyte reacts with the positive electrode to decompose, thereby generating gas. In particular, since manganese-containing oxides (may be referred to as "manganese oxides" simply, hereinafter) such as manganese dioxide exhibit catalytic action against the solvent of the electrolyte, the decomposition reaction of the electrolyte becomes notable by using manganese oxides in the positive electrode. Especially, in a high temperature region exceeding 100° C., the electrolyte is decomposed more easily, and generated gas may increase internal pressure of the battery. In coin-type batteries, the increase in the internal pressure of the batteries may possibly impair contact between parts inside the batteries, which leads to a reduction in the pulse discharge characteristics due to an increase in the internal resistance of the batteries. Further, there are also possibilities of electrolyte leakage, breakdown, and explosion of the batteries, which may give damages to electronic devices. Also, in cylindrical batteries having a current collecting structure by leads, electrolyte leakage may be caused by an increase in the internal resistance of the batteries, which may lower battery characteristics.

Meanwhile, Patent Literatures 1 to 4 propose a method for adding cyclic sultone derivatives, acid anhydrides and the like to the electrolyte in order to suppress generation of gas in such a high temperature region.

Also, Patent Literature 5 proposes a method for suppressing generation of gas in the high temperature environment by reforming manganese oxide.

Citation List

[Patent Literatures]
[PTL 1] Japanese Laid-Open Patent Publication 11-162511
[PTL 2] Japanese Laid-Open Patent Publication 2000-3724
[PTL 3] Japanese Laid-Open Patent Publication 2005-216867
[PTL 4] Japanese Laid-Open Patent Publication 2004-47413
[PTL 5] Japanese Laid-Open Patent Publication 2006-100247

SUMMARY OF INVENTION

Technical Problems

According to researches by the present inventors, in the inventions disclosed in Patent Literatures 1 to 5, generation of gas is suppressed and an improvement in the battery characteristics is observed in the temperature region of 100° C. or less as compared to conventional batteries. However, in the temperature region exceeding 100° C., the effect of suppressing generation of gas is not sufficient, and an increase in the internal resistance due to expansion of the batteries and a decrease in the pulse discharge characteristics along with that, and further, defects such as electrolyte leakage were confirmed. In particular, in order to use the batteries as power sources for on-vehicle electronic devices, it is necessary to withstand in a high temperature region of up to about 125° C. Therefore, the effect of suppressing generation of gas is not sufficient in the inventions disclosed in Patent Literatures 1 to 5. In lithium batteries in accordance with the inventions disclosed in Patent Literatures 1 to 5, the upper limit of the ambient temperature for use is generally about 60 to 85° C., and also the time for use of these batteries is considered to be limited to a relatively short time.

In order to obtain further the effect of suppressing generation of gas, it is considered, for example, to increase the addition amount of cyclic sultone derivatives and acid anhydrides. In this case, however, the internal resistance increases all the more, exhibiting a further notable decrease in the pulse discharge characteristics. Consequently, it is difficult to improve the reliability in the high temperature environment by simply adding additives to the electrolyte.

The present invention has an object to suppress generation of gas in the high temperature region without decreasing the pulse discharge characteristics. In particular, the present invention has an object to provide a lithium battery exhibiting improved storage characteristics and pulse discharge characteristics in the high temperature region of 100° C. or more.

Solution to Problems

In order to solve the above problems, a lithium battery in accordance with the present invention comprises a positive electrode including manganese oxide in mixed crystal state, a negative electrode desorbing lithium ions at discharging, and a non-aqueous electrolyte having a lithium ion conductivity, wherein the manganese oxide in mixed crystal state includes at least λ-type manganese oxide and β-type manganese oxide, and the electrolyte includes at least one additive selected from the group consisting of sultone compounds and sulfone compounds.

According to the above lithium battery, it is possible to suppress decomposition of the electrolyte and generation of gas accompanying that without lowering the pulse discharge characteristics. Since such action and effect can be exhibited appropriately not only in the living temperature region (−20 to 60° C.) but also in the high temperature region of 100° C. or more (particularly about 125° C.), for example, the storage characteristics as well as the pulse discharge characteristics can be improved in a wide temperature region including the above high temperature region.

In the above lithium battery, considering managing both the storage characteristics and the pulse discharge characteristics, it is preferable that the non-aqueous electrolyte contains 0.5% by mass or more and 5.0% by mass or less of the above additive.

Further, in the above lithium battery, considering managing both the storage characteristics and the pulse discharge characteristics, it is preferable that the β-type manganese oxide has a crystallinity of more than 500 and 800 or less, more preferably 550 or more and 800 or less.

Moreover, in the above lithium battery, considering managing both the storage characteristics and the pulse discharge characteristics, it is preferable that the manganese oxide in mixed crystal state has a specific surface area of 0.5 m$^2$/g or more and 7.0 m$^2$/g or less.

Advantageous Effects Of Invention

According to the lithium battery of the present invention, generation of gas can be suppressed in the high temperature environment of 100° C. or more (particularly about 125° C.) without lowering the pulse discharge characteristics. Consequently, the storage characteristics and the reliability at a high temperature can be improved remarkably. Further, according to the present invention, the reliability of the battery can be improved not only in the high temperature region but also in the living temperature region, for example, by suppressing generation of gas. As a result, a lithium battery suitable for electronic devices requiring long-term reliability can be achieved.

BRIEF DESCRIPTION OF DRAWING

FIG. 1 A schematic sectional view of a coin-type lithium primary battery in accordance with an embodiment of the present invention.

DESCRIPTION OF EMBODIMENT

Next, the present invention will be described in detail by exemplifying a coin-type lithium primary battery in accordance with an embodiment of the present invention. The embodiment described in the following is a specific mode of the present invention and does not restrict the technical scope of the present invention.

Referring to FIG. 1, the coin-type lithium primary battery includes a positive electrode 3, a negative electrode 4, and a separator 5 interposed between the positive electrode 3 and the negative electrode 4. These are housed in an inside of a battery case 1 also serving as a positive electrode terminal and are in contact with a non-aqueous electrolyte not shown in the FIGURE in the battery case 1.

In an opening portion of the battery case 1, a gasket 6 that is formed by injection molding in circular shape is arranged, and a sealing plate 2 also serving as a negative electrode terminal is arranged interposing the gasket 6. An opening end of the battery case 1 is bent inwardly and tightens the gasket 6 with the sealing plate 2. Thus, the coin-type lithium primary battery is sealed.

In the coin-type lithium primary battery of FIG. 1, the positive electrode 3 includes manganese oxide in mixed crystal state as an active material.

The manganese oxide in mixed crystal state includes at least λ-type manganese oxide (manganese oxide having λ-type crystal structure) and β-type manganese oxide (manganese oxide having β-type crystal structure). In this manganese oxide in mixed crystal state, manganese has typically an oxidation number of quadrivalent. However, there is no limitation to this value and an increase or decrease to some extent is permitted.

The λ-type manganese oxide can be prepared by using spinel-type lithium-manganese oxide as a raw material and bringing this in contact with sulfuric acid solution to remove lithium. The content of lithium in the manganese oxide can be controlled voluntarily by adjusting the contact time of the spinel-type lithium-manganese oxide with the sulfuric acid solution. The λ-type manganese oxide is not limited to those obtained by the above preparation method, and any preparation method can be employed.

The β-type manganese oxide can be prepared by using the λ-type manganese oxide obtained by the above preparation method. Specifically, first, sulfuric acid remaining in this λ-type manganese oxide is removed by washing and is dried, and next, the resultant λ-type manganese oxide is baked at 100° C. or more and 300° C. or less. Thus, a part of the λ-type manganese oxide is converted into the β-type manganese oxide.

In the manganese oxide in mixed crystal state, it is preferable that the β-type manganese oxide has a crystallinity of more than 500 and 800 or less. By setting the crystallinity of the β-type manganese oxide to the above range, the storage characteristics and the pulse discharge characteristics can be compatible.

The crystallinity is a parameter evaluating the crystal state. The crystal state of the β-type manganese oxide formed partly in the λ-type manganese oxide by a heat treatment can be evaluated by the crystallinity.

When the crystallinity of the β-type manganese oxide is set to the above range, the balance between the entrance ability (surface reactivity) of lithium ions into the lattice of the manganese oxide, the diffusivity of lithium ions in the inside of the manganese oxide, the stability of lithium ions in the lattice of the manganese oxide and the like is optimized. Consequently, the electric characteristics, in particular the large current discharge characteristics and the pulse discharge characteristics are improved.

Meanwhile, when the crystallinity of the β-type manganese oxide exceeds the above range, lithium may have difficulties in entering the lattice of the manganese oxide, or the amount of the manganese oxide available for discharging may decrease. Consequently, the discharge characteristics may lower.

On the contrary, when the crystallinity of the β-type manganese oxide is below the above range, the size and the state of the crystal lattice become uneven, and a region where lithium ions can move easily and a region where lithium ions cannot move easily coexist on the surface and in the manganese oxide. Consequently, the overall discharge characteristics may possibly lower.

Within the range described above, the crystallinity of the β-type manganese oxide is more preferably 550 or more and 800 or less, and particularly preferably 600 or more and 700 or less.

The crystallinity of the β-type manganese oxide can be determined by selecting a peak belonging to (110) face of the β-type manganese oxide from an X-ray diffraction image measured with respect to the manganese oxide in mixed crystal state, and dividing the height of the peak (intensity) by half width thereof.

It is preferable that the manganese oxide in mixed crystal state has a specific surface area of 0.5 m$^2$/g or more and 7.0 m$^2$/g or less. By setting the specific surface area of the manganese oxide in mixed crystal state to the above range, the storage characteristics and the pulse discharge characteristics can be compatible.

When the manganese oxide in mixed crystal state has a specific surface area below the above range, the discharge reaction site where the electrolyte is in contact with the manganese oxide may decrease, which may lower the continuous discharge performance at a large current and the pulse discharge characteristics. On the other hand, when the manganese oxide in mixed crystal state has a specific surface area exceeding the above range, the effect of suppressing the decomposition reaction of the electrolyte by the manganese oxide may decrease, and consequently, generation of gas cannot be suppressed appropriately.

It is more preferable that within the above range, the manganese oxide in mixed crystal state has a specific surface area of 3.0 m$^2$/g or more and 5.0 m$^2$/g or less within the above range, in particular.

The positive electrode 3 is produced, for example, by mixing the manganese oxide in mixed crystal state as a positive electrode active material, and components such as a conductive agent and a binder as necessary, and forming a resultant positive electrode material mixture in disk shape, flat plate shape etc. according to the shape of the positive electrode 3.

As the conductive agent, a variety of conductive agents known in this field can be exemplified. Specific examples thereof include graphites; carbon blacks such as acetylene black, Ketjen black, channel black, furnace black, lump black, thermal black; carbon fiber; and various metal fibers. These components can be used singly, or in a mixture of two or more kinds.

As the binder, a variety of binders known in this field can be exemplified. Specific examples thereof include polyethylene, polypropylene, polytetrafluoroethylene (PTFE), polyvinylidene fluoride, tetrafluoroethylene-hexafluoropropylene copolymer, and vinylidene fluoride-hexafluoropropylene copolymer. These binders can be used singly or in a mixture of two or more kinds.

In the positive electrode, a layer comprising the positive electrode material mixture can be formed on the surface of the positive electrode current collector. In this case, for example, stainless steel, aluminum, and titanium can be used for the positive electrode current collector. The positive electrode material mixture may be prepared, for example, by mixing the manganese oxide in mixed crystal state as the positive electrode active material, a liquid component for dispersing the manganese oxide, and components such as a conductive agent and a binder as necessary, and applying and drying a resultant positive electrode material mixture slurry on the surface of the positive electrode current collector. In particular, in the case where the lithium battery of the present invention is not a coin-type battery as shown in FIG. 1 but is a so-called cylindrical or rectangular battery, the positive electrode produced as above is suitable.

In the coin-type lithium primary battery of FIG. 1, the negative electrode 4 is not particularly limited except for one desorbing lithium ions during discharging, and specific examples thereof include lithium and lithium alloys. These materials can be used singly or in combination of two or more kinds.

The negative electrode 4 is produced, for example, by forming a hoop material of lithium or a lithium alloy in disk shape, flat plate shape etc. according to the shape of the negative electrode 4.

In the negative electrode, for example, a layer comprising a negative electrode material mixture may be formed on a surface of the negative electrode current collector. In this case, for the negative electrode current collector, copper, nickel, stainless steel etc. can be used, for example. The negative electrode material mixture can be prepared, for example, by mixing a negative electrode active material such as a carbon material provided with lithium beforehand and a compound including lithium, a liquid component for dispersing the negative electrode active material, and components such as a conductive agent and a binder as necessary, and applying and drying a resultant negative electrode material mixture slurry on the surface of the negative electrode current collector. In particular, in the case where the lithium battery of the present invention is not a coin-type battery as shown in FIG. 1 but is a so-called cylindrical or rectangular battery, the negative electrode produced as above is suitable.

In the coin-type lithium primary battery of FIG. 1, a variety of materials known in the field of the present invention can be used for the separator 5. Specific examples thereof include nonwoven cloth and microporous film made of resin, and these materials are cut out into circular shape for use. Also, examples of the material forming the separator 5 include polyphenylene sulfide (PPS), polyethylene, polypropylene, mixture of polyethylene and polypropylene, and copolymer of ethylene and propylene.

In the coin-type lithium primary battery of FIG. 1, the non-aqueous electrolyte is not particularly limited except for one having lithium ion conductivity and containing additives as described later. Examples of solvent for the non-aqueous electrolyte include a variety of materials known in the field of the present invention. This non-aqueous electrolyte permeates the inside of the positive electrode 3 and the separator 5.

Specific examples of the solvent for the non-aqueous electrolyte include chain carbonic esters such as dimethyl carbonate, diethyl carbonate, and ethylmethyl carbonate; cyclic carbonic esters such as ethylene carbonate, propylene carbonate, and butylene carbonate; chain ethers such as 1,2-dimethoxyethane, 1,2-diethoxyethane, ethoxymethoxyethane, cyclic ethers such as tetrahydrofuran, 2-methyl tetrahydrofuran, 1,3-dioxolane, and 4-methyl-1,3-dioxolane; and cyclic carboxylic acid esters such as γ-butyrolactone. These components can be used singly or in combination of two or more kinds.

Among the above solvents, since chain carbonic esters and cyclic carbonic esters have a high boiling point and high viscosity, the battery characteristics at a low temperature lowers when these solvents are used. Therefore, the above solvents are preferably a mixed solvent including chain ethers and cyclic ethers having a low boiling point and low viscosity.

In the present invention, since the positive electrode comprises manganese oxide, a mixed solvent of propylene carbonate and 1,2-dimethoxyethane is particularly preferable as the solvent. The mixing ratio of the carbonic ester solvent such as propylene carbonate (PC) and the ether solvent such as 1,2-dimethoxyethane (DME) is preferably 20:80 to 80:20 in volume ratio.

In the case where the solvent of the non-aqueous electrolyte includes PC and DME, the proportion of the sum of PC and DME relative to the total amount of the non-aqueous electrolyte is not limited to but preferably 60 to 98% by mass and more preferably 90 to 97% by mass.

Examples of lithium salts contained in the non-aqueous electrolyte include lithium salts such as $LiClO_4$, $LiBF_4$, $LiN(CF_3SO_2)$, $LiC(CF_3SO_2)_3$, $LiCF_3SO_3$, $LiPF_6$, and $LiAsF_6$. These lithium salts can be used singly, or in combination of two or more kinds.

In the present invention, since the positive electrode comprises manganese oxide, $LiClO_4$ is particularly preferable as the lithium salt.

The concentration of the lithium salt in the non-aqueous electrolyte is preferably 0.2 to 2.0 mol/L, for example.

The non-aqueous electrolyte includes at least one additive selected from the group consisting of sultone compounds and sulfone compounds.

Examples of the sultone compounds include 1,3-propanesultone, 1,4-butanesultone, and prop-1-ene-1,3-sultone.

Examples of the sulfone compounds include chain sulfones such as dimethyl sulfone, diethyl sulfone, ethylmethyl sulfone, methylpropyl sulfone, ethylpropyl sulfone, diphenyl sulfone, methylphenyl sulfone, ethylphenyl sulfone, dibenzyl sulfone, benzylmethyl sulfone, benzylethyl sulfone; and cyclic sulfones such as sulfolane (tetramethylene sulfone), 2-methyl sulfolane, 3-methyl sulfolane, 2-ethyl sulfolane, 3-ethyl sulfolane, 2,4-dimethyl sulfolane, 2-phenyl sulfolane, 3-phenyl sulfolane, sulfolene, and 3-methyl sulfolene.

Among the additives listed above, 1,3-propanesultone, 1,4-butanesultone, dimethyl sulfone, sulfolane, and 3-methyl sulfolane are preferable. Among these additives in particular, 1,3-propanesultone, 1,4-butanesultone, and 3-methyl sulfolane is preferable, and 1,3-propanesultone are particularly preferable.

The content of the above additives in the non-aqueous electrolyte is preferably 0.5% by mass or more and 5.0% by mass or less. By setting the content of the additives to this range, the storage characteristics and the pulse characteristics can be compatible. Within the above range, in particular, the content of the above additives in the non-aqueous electrolyte is preferably 1.0% by mass and 3.0% by mass or less.

In the present invention, as for the principle of suppressing generation of gas, it is considered that by adding sultone compounds or sulfone compounds to the electrolyte, a coating film is formed on the surface of the positive electrode 3, which reduces decomposition of the electrolyte in a high temperature environment. As the addition amount of the sultone compounds or sulfone compounds increases, the formation of the coating film on the surface of the positive electrode 3 becomes distinct. Consequently, the amount of gas generated in a high temperature environment decreases, thereby suppressing expansion of the battery.

However, the discharge reaction site where the electrolyte is in contact with the manganese oxide may decrease by the coating film formed on the surface of the positive electrode 3, resulting in a decrease in the pulse discharge characteristics and a rise in the internal resistance. Further, sultone compounds and sulfone compounds react with lithium in the negative electrode 4 and form an insulating coating film on the surface of the negative electrode 4. For this reason, when the addition mount of the sultone compounds or sulfone compounds is large, generation of gas in a high temperature environment is suppressed and thus expansion of the battery is prevented. However, a further decrease in the pulse discharge characteristics and a rise in the internal resistance are caused. If the addition amount of the sultone compounds or sulfone compounds is reduced, the pulse discharge characteristics are not deteriorated considerably. However, the reaction surface of the positive electrode cannot be coated sufficiently, which leads to generation of gas or increase in the internal resistance due to decomposition of the electrolyte in the high temperature environment.

Meanwhile, when the content of the above additives in the non-aqueous electrolyte is set to the above range, not all the additives are consumed for formation of the coating film, and some additives remain in the electrolyte.

In the above disclosure, although the embodiment of the present invention was explained by exemplifying the coin-type lithium primary battery, the shape of the lithium primary battery of the present invention is not limited thereto. A variety of shapes such as rectangular, cylindrical, sheet, button, flat, and laminate types can be selected appropriately corresponding to uses.

EXAMPLES

Next, the present examples will be described with reference to a specific example.

(1) Preparation of Manganese Oxide in Mixed Crystal State

First, manganese dioxide, lithium hydroxide and lithium carbonate were mixed in a prescribed ratio, and this mixture was baked at 800° C. to prepare spinel-type lithium manganese oxide. The resultant spinel-type lithium manganese oxide was immersed in sulfuric acid solution to remove lithium from the lithium manganese oxide. Thereafter, washing and drying processes were carried out, thereby preparing λ-type manganese oxide.

Next, the resultant λ-type manganese oxide was heat treated at 200° C. for 2 hours in the air. In this manner, manganese oxide in mixed crystal state was obtained containing β-type manganese oxide and λ-type manganese oxide, having a specific surface area of 4.0 $m^2/g$, wherein the β-type manganese oxide had a crystallinity of 600.

The crystallinity and the specific surface area of the manganese oxide were measured or determined by the following methods, respectively.

<Crystallinity>

The crystallinity was determined by measuring a diffraction image of the manganese oxide in mixed crystal state using an X-ray diffraction apparatus ("X'Pert", manufactured by Phillips), and dividing the height (intensity) of a peak belonging to (110) face of the β-type manganese oxide by half width thereof.

<Specific Surface Area>

The specific surface area was measured by the BET specific surface area analysis (multi-point method). As the measurement apparatus, "ASAP 2010", of Shimazu Corporation (manufactured by Micromeritics) was used, and nitrogen was used as an adsorbent gas.

(2) Production of Positive Electrode

To 100 parts by mass of the obtained manganese oxide in mixed crystal state, 5 parts by mass of Ketjen black as a conductive agent, and 5 parts by mass of polytetrafluoroethylene as a binder were added and mixed sufficiently, thereby preparing a positive electrode material mixture. Then, this positive electrode material mixture was formed into disk shape having a diameter of 20 mm and a thickness of 3.0 mm and dried at 200° C., thereby producing the positive electrode.

(3) Production of Negative Electrode

The negative electrode was produced by cutting out a hoop made of metallic lithium having a thickness of 1.0 mm into disk shape having a diameter of 20 mm.

(4) Preparation of Electrolyte

The non-aqueous electrolyte was prepared by using propylene carbonate and 1,2-diethoxyethane as non-aqueous solvents and mixing these solvents in a volume ratio of 50:50. Then, $LiClO_4$ as an electrolyte was dissolved in this mixed solvent at a concentration of 0.5 mol/L. Further, 1,3-propanesultone was added to be 2.0% by mass relative to the total amount of the non-aqueous electrolyte.

(5) Production of Coin-type Lithium Primary Battery

Nonwoven cloth of polyphenylene sulfide (PPS) was used for the separator 5. PPS was also used for the gasket 6.

Next, in the battery case (positive electrode terminal) 1 made of stainless steel, the positive electrode 3 and the separator 5 were arranged in this order, and the gasket 6 was arranged in the periphery of the inside of the battery case 1. Meanwhile, the negative electrode 4 was arranged on the inner surface of the sealing plate (negative electrode terminal) 2 made of stainless steel. Then, the above electrolyte was poured into the inside of the battery case 1, and after the positive electrode 3 and the separator 5 were brought in contact with the non-aqueous electrolyte, the battery case 1 was sealed with the sealing plate 2, thereby producing the coin-type lithium primary battery as shown in FIG. 1. This battery was designated as a battery A.

Also, coin-type lithium primary batteries were produced in the same manner as the battery A except for changing the additives in the non-aqueous electrolyte to those shown in Table 1. These batteries were designated as batteries B to E.

In contrast, a coin-type lithium primary battery was produced in the same manner as the battery A except for not adding any additive to the non-aqueous electrolyte. This battery was designated as a battery F.

Further, coin-type lithium primary batteries were produced in the same manner as the battery A except for changing the addition amount of 1,3-propanesultone (additive) to the non-aqueous electrolyte to amounts shown in Table 2. These batteries were designated as batteries G to L.

(6) Physical Properties of Batteries

The batteries A to L were evaluated as follows. Tables 1 and 2 below show data and evaluation results.

<Expansion of Batteries at High Temperature>

Each battery was stored in an environment at 125° C. for 240 hours and the thickness of the battery before and after the storage were measured. The difference of the thickness (mm) was defined as "expansion after storage". Also, internal resistance (IR) before and after the storage was measured by alternating current method at 1 kHz, and the difference (Ω) was defined as "IR change".

<Low-Temperature Pulse Voltage>

Each battery were left in an environment at −40° C. for 3 hours, and after the temperature of the battery surface reached −40° C., intermittent discharge repeating a pattern of discharging at 8 mA for 0.5 seconds and resting for 2 minutes was carried out for 50 hours. A lowest voltage (pulse voltage/V) of the battery during this intermittent discharge was measured.

In Tables below, evaluations of 4 stages "A+", "A", "B", and "C" were made in the columns of physical properties. These evaluations indicate, in this order, "extremely favorable", "favorable", "permissible in practical use", and "inappropriate in practical use" with regard to each evaluation item.

TABLE 1

| | Additive | | Evaluation of Physical Properties | | |
|---|---|---|---|---|---|
| | Type | Addition amount (% by mass) | Expansion after storage (mm) | IR change (Ω) | Pulse voltage (V) |
| Battery A | 1,3-propane sultone | 2.0 | 0.14 A+ | 43 A+ | 2.35 A+ |
| Battery B | 1,4-butane sultone | 2.0 | 0.16 A+ | 50 A+ | 2.32 A+ |
| Battery C | Dimethyl sulfone | 2.0 | 0.95 A | 86 A | 2.16 A |
| Battery D | Sulfolane | 2.0 | 0.89 A | 87 A | 2.18 A |

TABLE 1-continued

| | Additive | | Evaluation of Physical Properties | | |
|---|---|---|---|---|---|
| | Type | Addition amount (% by mass) | Expansion after storage (mm) | IR change (Ω) | Pulse voltage (V) |
| Battery E | 3-methyl sulfolane | 2.0 | 0.54 A | 33 A+ | 2.31 A+ |
| Battery F | None | — | 1.84 C | 120 C | 2.43 A+ |

TABLE 2

| | Addition amount of additive (% by mass) | Evaluation of Physical Properties | | |
|---|---|---|---|---|
| | | Expansion after storage (mm) | IR change (Ω) | Pulse voltage (V) |
| Battery F | — | 1.84 C | 120 C | 2.43 A+ |
| Battery G | 0.1 | 1.05 B | 80 A | 2.40 A+ |
| Battery H | 0.5 | 0.25 A+ | 42 A+ | 2.38 A+ |
| Battery I | 1.0 | 0.20 A+ | 34 A+ | 2.37 A+ |
| Battery A | 2.0 | 0.14 A+ | 43 A+ | 2.35 A+ |
| Battery J | 3.0 | 0.15 A+ | 47 A+ | 2.33 A+ |
| Battery K | 5.0 | 0.10 A+ | 84 A | 2.19 A |
| Battery L | 10.0 | 0.09 A+ | 98 B | 2.05 A |

As shown in Table 1, the batteries A to E including, as additive, in the non-aqueous electrolyte, 1,3-propanesultone, 1,4-butanesultone, dimethyl sulfone, sulfolane, or 3-methyl sulfolane in the ratio of 2.0% by mass had favorable evaluation results with regard to both expansion after storage and IR change as compared to the battery F not including additive, and thus an improvement of properties in the high temperature environment was confirmed.

Also, as shown in Table 2, the batteries A and G to L including, in the non-aqueous electrolyte, 1,3-propanesultone in the ratio of 0.1 to 10.0% by mass had favorable evaluation results with regard to both expansion after storage and IR change as compared to the battery F not including additive in the non-aqueous electrolyte.

Further, the battery G including an addition amount of 1,3-propanesultone less than 0.5% by mass had a smaller expansion after storage than the battery F. However, the effect thereof was smaller than the batteries H to L. In contrast, in the battery L including an addition amount of 1,3-propanesultone exceeding 5.0% by mass, expansion after storage could be suppressed, but IR change somewhat increased. The reason for this is considered that, in the case where the addition amount of additive is small, the effect thereof does not readily appear, and the battery expands because of decomposition of the electrolyte and generation of gas accompanying that; in the case where the addition amount of additive is large, although generation of gas caused by decomposition of the electrolyte can be suppressed, the amount of resistant components increases.

In the case where the additives used in the batteries B to E were used in varying the addition amount thereof, tendencies similar to the batteries A and G to L were observed. From the above results, it was found that the amount of additives included in the non-aqueous electrolyte was preferably 0.5% by mass or more and 5.0% by mass or less. Similar tendencies were observed with regard to the addition amount of these additives in the case where two or more additives were mixed for use.

<Production of Coin-type Lithium Primary Battery and Evaluation of Physical Properties>

Next, the crystallinity of the manganese oxide in mixed crystal state included in the positive electrode 3 was examined.

Coin-type lithium primary batteries were obtained in the same manner as the battery A except that the crystallinity of the β-type manganese oxide of the manganese oxide in mixed crystal state was changed to the values shown in Table 3. These batteries were designated as batteries M to S. All of the β-type manganese oxide used in the batteries M to S had a specific surface area of about 4.0 m$^2$/g. The crystallinity of the β-type manganese oxide was controlled appropriately by varying the heat treatment temperature of the λ-type manganese oxide within the range of 100 to 300° C. while fixing the average particle diameter of the manganese oxide.

Also, a coin-type lithium primary battery was obtained in the same manner as the battery A except for using only the β-type manganese oxide having a crystallinity of 100 in place of the manganese oxide in mixed crystal state of the β-type manganese oxide and the λ-type manganese oxide. This battery was designated as a battery α.

For evaluation of the batteries A, M to S, and α, expansion after storage at high temperature, IR change, and pulse discharge characteristics at low temperature of these batteries were measured in the same manner as in evaluation of the battery A. The results are shown in Table 3.

TABLE 3

| | | Evaluation of Physical Properties | | |
|---|---|---|---|---|
| | Crystallinity of β-type manganese oxide | Expansion after storage (mm) | IR change (Ω) | Pulse voltage (V) |
| Battery α | 100 *1 | 1.40 C | 125 C | 2.39 A+ |
| Battery M | 400 | 0.52 A | 83 A | 2.38 A+ |
| Battery N | 501 | 0.20 A+ | 56 A | 2.35 A+ |
| Battery O | 550 | 0.18 A+ | 52 A+ | 2.34 A+ |
| Battery A | 600 | 0.14 A+ | 43 A+ | 2.35 A+ |
| Battery P | 650 | 0.14 A+ | 44 A+ | 2.34 A+ |
| Battery Q | 700 | 0.15 A+ | 46 A+ | 2.33 A+ |
| Battery R | 800 | 0.16 A+ | 50 A+ | 2.27 A+ |
| Battery S | 900 | 0.16 A+ | 50 A+ | 2.04 A |

*1: The values in the column of the "crystallinity of β-type manganese oxide" in Table 3 show the crystallinity of the β-type manganese oxide of the manganese oxide in mixed crystal state of the β-type and the λ-type in the batteries A and M to S. Meanwhile, the value in the battery α shows the crystallinity of the β-type manganese oxide (singly).

As shown in Table 3, both expansion after storage and IR change were suppressed in the batteries A and N to R as compared to the battery M. The battery M having a crystallinity below 500 expanded slightly by generation of gas due to decomposition of the electrolyte, and it had a slightly increased IR change as well. In the battery S having a crystallinity exceeding 800, both expansion after storage and IR change could be suppressed, but the pulse voltage decreased slightly because lithium could not readily enter the lattice of the manganese oxide. From the above results, it was found that the crystallinity of the β-type manganese oxide was preferably over 500, and 800 or less.

In contrast, the battery α using only the β-type manganese oxide (crystallinity: 100) had a favorable pulse voltage, but it had an extremely increased expansion after storage and IR change. Therefore, from the result of the battery α, it was found that even in the case where 1,3-propanesultone was included in the non-aqueous electrolyte, the physical properties of the battery were insufficient when the manganese oxide was the β-type manganese oxide singly.

<Production of Coin-type Lithium Primary Battery and Evaluation of Physical Properties>

Next, the manganese oxide in mixed crystal state included in the positive electrode 3 was examined with regard to its specific surface area.

Coin-type lithium primary batteries were obtained in the same manner as the battery A except for changing the specific surface area of the manganese oxide in mixed crystal state to the values shown in Table 4. These batteries were designated as batteries T to Z. All of the β-type manganese oxide used in the batteries T to Z had a crystallinity of about 600. The specific surface area of the manganese oxide was controlled appropriately by varying the heat treatment temperature of the λ-type manganese oxide within the range of 100 to 300° C. while fixing the amount of lithium contained in the manganese oxide.

For evaluation of the batteries A and T to Z, expansion after storage at high temperature, IR change, and pulse discharge characteristics at low temperature were measured in the same manner as in the evaluation of the battery A. The results are shown in Table 4.

TABLE 4

| | Specific | Evaluation of Physical Properties | | |
|---|---|---|---|---|
| | surface area of manganese oxide (m$^2$/g) | Expansion after storage (mm) | IR change (Ω) | Pulse voltage (V) |
| Battery T | 0.2 | 0.10 A+ | 38 A+ | 2.08 A |
| Battery U | 0.5 | 0.15 A+ | 46 A+ | 2.30 A+ |
| Battery V | 3.0 | 0.14 A+ | 44 A+ | 2.31 A+ |
| Battery A | 4.0 | 0.14 A+ | 43 A+ | 2.35 A+ |
| Battery W | 5.0 | 0.14 A+ | 43 A+ | 2.35 A+ |
| Battery X | 6.0 | 0.18 A+ | 48 A+ | 2.36 A+ |
| Battery Y | 7.0 | 0.20 A+ | 50 A+ | 2.38 A+ |
| Battery Z | 9.0 | 0.40 A | 80 A | 2.40 A+ |

As shown in Table 4, all the batteries A and U to Y had small expansion after storage and small IR change, and they also had favorable pulse voltage. In contrast, the battery T having a specific surface area of the manganese oxide below 0.5 m$^2$/g had favorable evaluation with regard to expansion after storage and IR change, but it had a slightly low pulse voltage. The reason for this is considered that since the manganese oxide had a small specific surface area, the discharge reaction site became small as well.

Meanwhile, the battery Z having a specific surface area of the manganese oxide exceeding 7.0 m$^2$/g had favorable pulse voltage but had relatively large expansion after storage and IR change. The reason for this is considered that since the manganese oxide had a large specific surface area, the portion in contact with the electrolyte increased, thereby increasing generation of gas due to decomposition of the electrolyte. From the above results, it was found that the specific surface area of the manganese oxide in mixed crystal state was preferably 0.5 m$^2$/g or more and 7.0 m$^2$/g or less.

[Industrial Applicability]

The lithium battery of the present invention has a wide use and is suitable for applications requiring use of electronic devices in a wide temperature region of −40 to 125° C. and driving of electronic devices for longer period of time than conventionally. In particular, it is suitably used as power source for electronic devices requiring reliability for a long period of time, and for electronic devices requiring excellent large discharge current characteristics or pulse discharge characteristics. Also, the lithium battery of the present invention is applicable for high quality tire pressure monitoring (management) system, for example.

The invention claimed is:

1. A lithium battery comprising:
    a positive electrode including manganese oxide in a mixed crystal state;
    a negative electrode desorbing lithium ions during discharging; and
    a non-aqueous electrolyte having lithium ion conductivity,
    wherein said manganese oxide in a mixed crystal state includes at least λ-type manganese oxide and β-type manganese oxide,
    said β-type manganese oxide has a crystallinity of greater than 500 and equal to or less than 800, and
    said non-aqueous electrolyte includes at least one additive selected from the group consisting of sultone compounds and sulfone compounds.

2. The lithium battery in accordance with claim 1,
    wherein said non-aqueous electrolyte includes 0.5% by mass or more and 5.0% by mass or less of said additive.

3. The lithium battery in accordance with claim 1,
    wherein said β-type manganese oxide has a crystallinity of equal to or greater than 550 and equal to or less than 800 or less.

4. The lithium battery in accordance with claim 1,
    wherein said manganese oxide in a mixed crystal state has a specific surface area of equal to or greater than $0.5 \text{ m}^2/\text{g}$ and equal to or less than $7.0 \text{ m}^2/\text{g}$.

* * * * *